Figure 1:
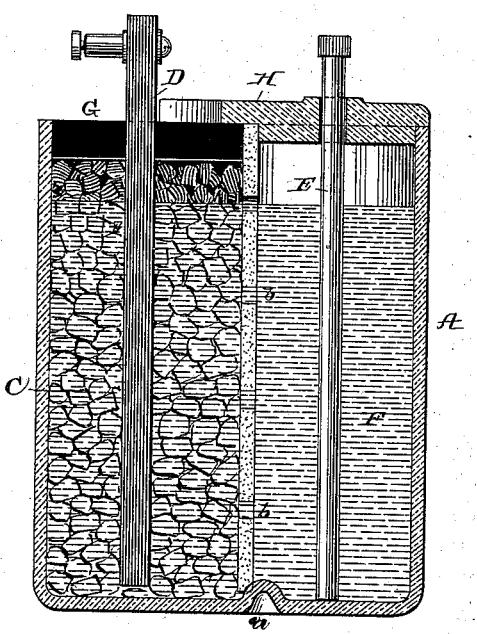

(No Model.)

E. A. WILDT.
ELECTRIC BATTERY.

No. 383,548. Patented May 29, 1888.

WITNESSES:

INVENTOR,
Edward A. Wildt.
BY Dyer & Seely.
ATTORNEYS.

United States Patent Office.

EDWARD A. WILDT, OF LONG ISLAND CITY, NEW YORK.

ELECTRIC BATTERY.

SPECIFICATION forming part of Letters Patent No. 383,548, dated May 29, 1888.

Application filed September 2, 1887. Serial No. 248,592. (No model.)

*To all whom it may concern:*

Be it known that I, EDWARD A. WILDT, of Long Island City, in the county of Queens and State of New York, have invented a certain new and useful Improvement in Electric Batteries, of which the following is a specification.

My invention relates to the batteries known as "Leclanché batteries," in which one element consists of fragments of carbon mixed with peroxide of manganese as a depolarizing agent, while the other is a zinc rod or pencil, these elements being in a solution of sal ammoniac and water.

The object of my invention is to provide a simple and effective construction for batteries of this character, whereby the carbon and zinc elements will be kept apart, but the liquid solution will readily reach both elements; and to this end my invention consists, mainly, in the employment of a partition dividing the cell into compartments, which partition is made of a material impervious to the liquid solution—preferably glass—but is provided with numerous perforations, and preferably is fitted loosely at its bottom and sides, so that while the liquid can pass freely through its perforations and around it the fragments of carbon and manganese are kept away from the zinc.

This arrangement has various advantages over the porous cup or partition ordinarily used. First, it makes a cell of lower resistance, since, instead of the resistance of the porous material being interposed, the liquid is continuous through and around the perforated partition, and there is therefore only the resistance of the liquid itself. Further, the porous material absorbs the liquid, and the height of the liquid in the cell is thus lowered, which reduces the efficiency of the battery; but as my partition is impervious to the liquid this action does not occur with my invention and the height of the liquid remains the same. It is found, also, in the ordinary Leclanché cell that when the battery is short-circuited and runs down rapidly for a time the porous partition becomes clogged, its pores being filled up by chemical deposition. This also cannot occur with my battery. I prefer to employ a curved glass partition held in place by projections molded on the inner surface of the glass battery-jar. After the carbon and manganese are placed in their compartment, I prefer to seal the top thereof by means of pitch or similar material, which is poured thereon and sets hard, and through which the carbon plate projects for making connection. The other compartment I prefer to close by a tightly-fitting flanged cover of glass, through a hole in which the zinc rod extends.

My invention is illustrated in the accompanying drawings, in which—

Figure 2:
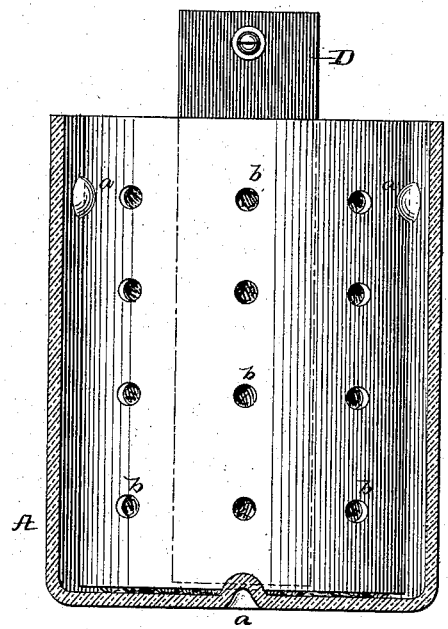
Figure 3:
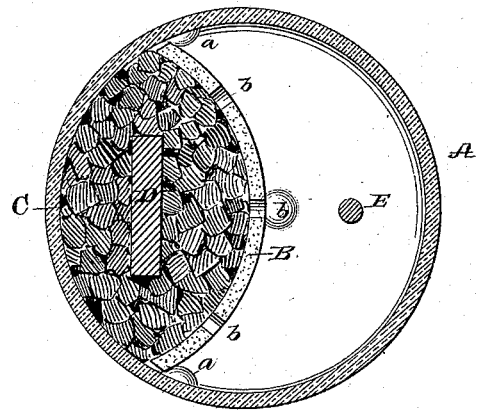

Figure 1 is a vertical section of a battery-cell embodying said invention; Fig. 2, a vertical section opposite to that of Fig. 1, and Fig. 3 a horizontal section of the same.

A is a suitable cylindrical glass jar or cell having the internal projections, $a\ a\ a$, molded upon it.

B is a curved glass plate provided with numerous apertures or perforations, $b\ b$. This plate is set in the jar A, being held in place by the projections $a\ a$ at the bottom and sides of the jar, and it is of such size that it does not fit closely against the jar, but a space is left at the sides and bottom.

C is the fragments of carbon and peroxide of manganese; D, the carbon plate extending therefrom for connection with the circuit; E, the zinc rod, and F the liquid solution.

It will be seen that the carbon is kept in place by the partition B, while the liquid penetrates freely through and around the partition.

The carbon-compartment is sealed by pitch or similar material, G, which is poured in the top thereof and sets hard. A curved flanged cover, H, of glass, is set upon the top of the other compartment of the jar and fits tightly thereon, so as to close it. The zinc rod E extends through a hole in this lid or cover.

What I claim is—

1. The combination, with a battery-cell, of a partition extending across the cell, so as to separate the electrodes, made of a material impervious to the liquid of the cell and provided with perforations, substantially as set forth.

2. The combination, with a battery-cell, of a partition extending across the cell, so as to separate the electrodes, and fitting loosely at its sides and bottom and made of a material impervious to the liquid of the cell, substantially as set forth.

3. The combination, with a battery-cell, of a perforated glass partition extending across the cell, so as to separate the electrodes, substantially as set forth.

4. The combination, with a battery-cell, of an element of fragmentary material and a liquid solution therein, and a partition extending across the cell and inclosing said fragmentary element, said partition being made of a material impervious to the liquid of the cell and provided with perforations, substantially as set forth.

5. The combination, with a battery-cell, so as to separate the electrodes, of a perforated partition extending across the cell and fitting loosely at its sides and bottom, and made of a material impervious to the liquid of the cell, substantially as set forth.

This specification signed and witnessed this 1st day of August, 1887.

EDWARD A. WILDT.

Witnesses:
WILLIAM PELZER,
E. C. ROWLAND.